(12) United States Patent
Tsuzaki (10) Patent No.: US 7,980,766 B2
(45) Date of Patent: Jul. 19, 2011

(54) ROLLING BEARING UNIT

(75) Inventor: Youichi Tsuzaki, Osaka (JP)

(73) Assignee: JTEKT Corporation, Osaka (JP)

( * ) Notice: Subject to any disclaimer, the term of this patent is extended or adjusted under 35 U.S.C. 154(b) by 905 days.

(21) Appl. No.: 10/573,641

(22) PCT Filed: Sep. 27, 2004

(86) PCT No.: PCT/JP2004/014530
§ 371 (c)(1),
(2), (4) Date: Jan. 25, 2007

(87) PCT Pub. No.: WO2005/031180
PCT Pub. Date: Apr. 7, 2005

(65) Prior Publication Data
US 2008/0025660 A1    Jan. 31, 2008

(30) Foreign Application Priority Data
Sep. 26, 2003    (JP) .............................. P2003-335032

(51) Int. Cl.
*F16C 35/063*    (2006.01)
*F16C 43/04*    (2006.01)

(52) U.S. Cl. .................... 384/544; 384/489; 384/537

(58) Field of Classification Search ................. 384/537, 384/544, 448, 489, 559, 564, 584
See application file for complete search history.

(56) References Cited

U.S. PATENT DOCUMENTS

| 5,490,732 | A | 2/1996 | Hofmann et al. |
| 5,494,129 | A | 2/1996 | Krude et al. |
| 6,113,279 | A | 9/2000 | Sawai et al. |
| 6,478,471 | B2 * | 11/2002 | Ishida et al. ................. 384/537 |
| 6,622,377 | B1 * | 9/2003 | Johnson et al. ............... 29/724 |
| 2002/0126926 | A1 | 9/2002 | Ohtsuki et al. |

FOREIGN PATENT DOCUMENTS

| EP | 0852300 | 7/1998 |
| JP | 10-272903 | 10/1998 |
| JP | 2000-145797 | 5/2000 |
| JP | 2000-211302 | 8/2000 |
| JP | 2001-248650 | 9/2001 |
| JP | 2002-327715 | 11/2002 |
| JP | 2003-83353 | 3/2003 |

* cited by examiner

*Primary Examiner* — William C Joyce
(74) *Attorney, Agent, or Firm* — Jordan and Hamburg LLP

(57) ABSTRACT

The rolling bearing unit includes an outer ring, an inner shaft disposed radially inward of the outer ring and having an inner ring fitting part on the outer peripheral surface on the one axial direction side, an inner ring fitted on the inner ring fitting part and having the shaft end on the one axial direction side crimped on the end face of the one axial direction side thereof, the inner ring having a step portion on the one axial direction side of the shoulder portion, and the step portion having an inclined surface shape the diameter of which expands in the other axial direction.

5 Claims, 7 Drawing Sheets

ROLLING BEARING UNIT

BACKGROUND OF THE INVENTION

The present invention relates to a rolling bearing unit for wheel support suitable for rotatably supporting vehicle wheels on a suspension.

A rolling bearing unit of this sort comprises an outer ring, an inner shaft disposed concentrically with and radially inward of the outer ring and having an inner ring fitting part on the outer peripheral surface on one axial direction side. The unit also includes an inner ring fitted on the inner ring fitting part.

The above unit is configured so that, in a state where the outer end face on the one axial end side of the inner ring is pressed in the axial direction, the one axial direction side inner shaft end is crimped on the outer end face of the inner ring end. Such a rolling bearing unit is disclosed in Laid-Open Japanese Patent Applications 2001-248650 and H10-272903.

However, when the inner shaft end on the one axial direction side is crimped on the outer face of the inner ring end, force is generated on the inner ring end part. The force presses against the inner ring and spreads the inner ring radially outward, with the danger that the fitting position of the inner ring inside the rolling bearing unit may be affected. Further, when the inner ring has an end part outer peripheral surface with a step formed thereupon, if the inner shaft end is crimped on the outer peripheral surface of the inner ring while the step portion is being pressed in the axial direction, a large force is exerted radially outward on the inner ring. The force causes inclination of the fitting position of the inner ring.

BRIEF SUMMARY OF THE INVENTION

The rolling bearing of the present invention comprises an outer ring, an inner shaft disposed radially inward of the outer ring and having an inner ring fitting part on the outer peripheral surface on one axial direction side. The bearing includes an inner ring fitted on the inner ring fitting part and having the shaft end of the one axial end of the inner shaft crimped on the end face thereof on the one axial direction side. The inner ring has a step portion on one the axial direction side of the shoulder portion thereof and the step portion having an inclined surface shape the diameter of which expands in the direction of the other axial direction.

In manufacture of the rolling bearing unit, when the one axial end of the inner shaft is to be crimped on the end face of one axial end of the inner ring, crimping is carried out such that in a state where the inner ring is bound by, for example, an annular binding jig formed along the inclined surface of the inner ring step portion and axial-direction force is applied to the annular binding jig, the crimping jig engages with the inner shaft end and crimps the same so as to expand the diameter thereof.

When pressure in the axial direction is applied to the annular binding jig, pressing force from the annular binding jig presses against the inclined surface in the axial direction. This force comprises a pressing force pressing vertically against the inclined surface and a force along the inclined surface. Meanwhile, as the diameter of the inner shaft end is expanded by the crimping jig so as to follow the shape of the inner ring, a pressing force inclined with respect to the axial direction in the radial outward direction operates on the inner shaft end. This force comprises an axial force and a force directed radially outward.

Therefore, the force axially pressing the inclined surface is made overwhelmingly larger than the pressing force inclined with respect to the axial direction in the radially outward direction or the force directed radially outward at time of diameter-expansion by crimping jig to match inner ring shape. Because of this, between the inner ring and the inner shaft end, the force pressing vertically on the inclined surface and the force at the inner shaft end directed radially outward operate in mutually offsetting directions. Accordingly, the force operating to press down and widen the inner ring is reduced or offset. This effectively prevents inner ring inclination or damage.

The inclination angle of the inclined surface is preferably more than 90 degrees and less than 175 degrees with respect to the central axis of the inner ring. If the inclination angle is within the above range, inner ring inclination and damage can be effectively prevented when manufacturing a rolling bearing unit.

BRIEF DESCRIPTION OF THE DRAWINGS

Accompanying the specification are figures which assist in illustrating the embodiments of the invention, in which.

DETAILED DESCRIPTION OF THE INVENTION

A rolling bearing unit for wheel support of the embodiment of the present invention will be explained in detail with reference to the attached drawings.

Figure 1:
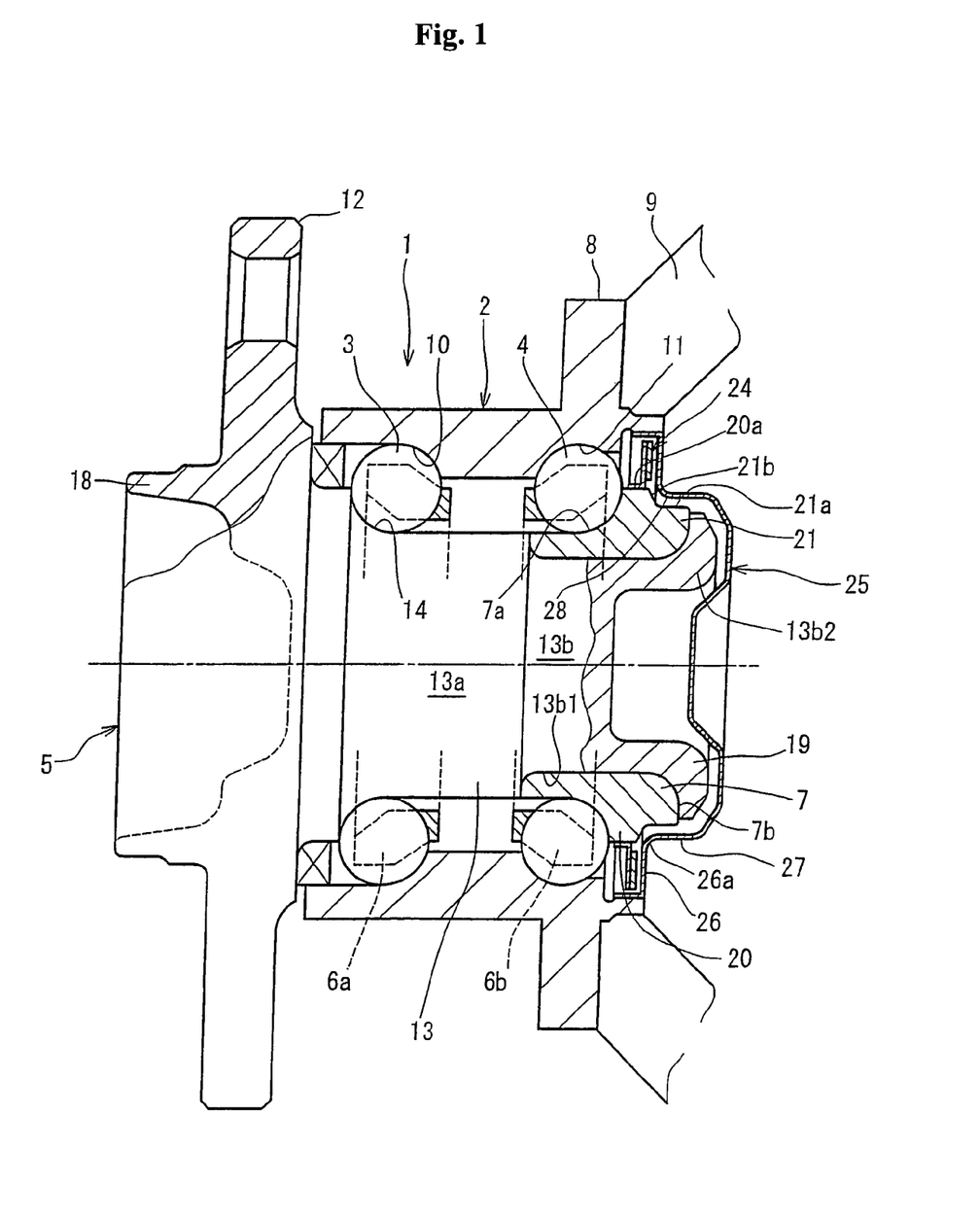
FIG. 1 is a cross-sectional view illustrating a rolling bearing unit according to an embodiment of the present invention.
Figure 2:
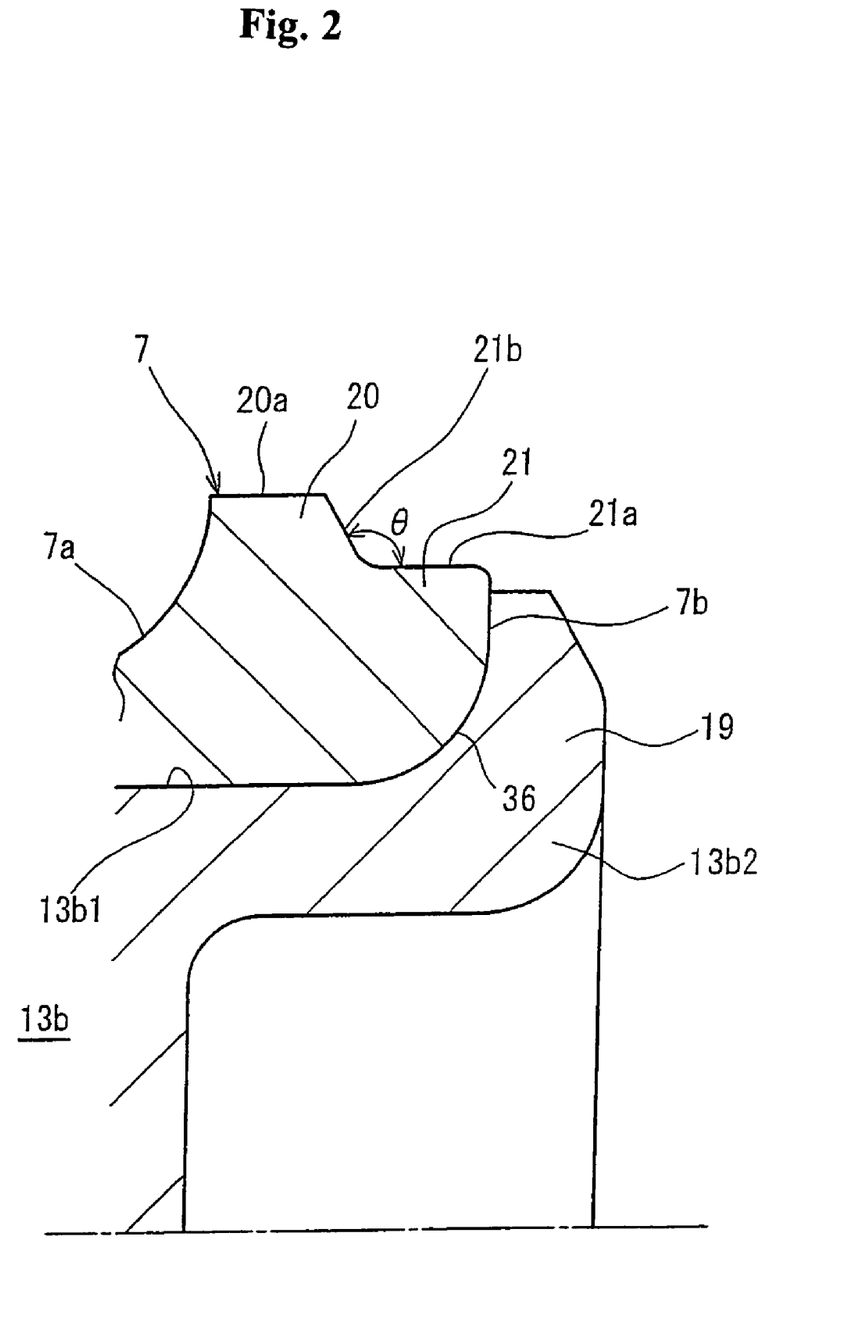
FIG. 2 is an enlarged cross-sectional view of a portion of FIG. 1.

FIG. 1 is a cross-sectional view illustrating a rolling bearing unit according to an embodiment of the present invention, and FIG. 2 is an enlarged cross-sectional view of the essential portion of FIG. 1. In FIGS. 1 and 2, the rightward direction is called the one axial direction, and leftward direction the other axial direction. 1 indicates an entire rolling bearing unit for wheel support for vehicle configured as a multi-row outward angular contact ball bearing. 2 indicates an outer ring; 3, 4 indicate ball rows; 5 indicates an inner shaft disposed radially inward of the outer ring 2; 6a, 6b indicate retainers; and 7 indicates an inner ring.

The outer ring 2 is configured as a cylinder extending axially, and comprises a radially outward extending flange portion 8, for fixing to a vehicle body, on the outer peripheral surface of the one axial direction and raceway portions 10, 11. Accordingly, a row of two is formed in the axial direction on the inner peripheral surface. On the flange portion 8, a knuckle 9 from the vehicle body side is fixed.

The inner shaft 5 is configured so that a spigot portion 18 is provided on the other axial end. A flange portion 12 is provided to one axial direction side of the spigot portion 18. An inner shaft body 13 is provided across the whole area from the flange portion 12 to the one axial direction side end.

The spigot portion 18 serves as wheel support, and extends toward the other axial direction in a cylindrical form with a flat outer peripheral surface.

The flange portion 12, which serves for wheel attachment, extends in an annular shape in the radially outward direction, extending beyond the outer diameter of the outer ring.

The inner shaft body 13 comprises a large-diameter shaft 13a on the other axial direction end and a small-diameter shaft 13b on the one axial direction end. The outer peripheral surface of the large-diameter shaft 13a comprises a raceway portion 14 opposite the raceway portion 10 of the outer ring 2. The outer peripheral surface of the small-diameter shaft 13b comprises an inner ring fitting part 13b1. The inner ring 7 comprises a raceway portion 7a on its outer peripheral surface opposite the raceway portion 11 of the outer ring 2. A shaft end 13b2 of the small-diameter shaft 13b has a cylindrical form and upon being crimped on the outer end face 7b of the inner ring 7, constitutes a crimping part 19 that applies a prescribed preload to the inside of the bearing.

On the inner ring 7, an annular step portion 21 is formed on the one axial direction side of a shoulder portion 20. The outer peripheral surface of the shoulder portion 20 is a cylindrical surface 20a that is flat in the axial direction. The outer peripheral surface of the step portion 21 comprises a cylindrical surface 21a having a smaller outer diameter than that of the shoulder portion 20 and extending in the axial direction and an annular inclined surface 21b that connects the cylindrical surface 21a with the outer peripheral cylindrical surface of the shoulder portion 20. The diameter of the inclined surface 21b gradually widens moving toward the other axial direction. The inclination angle θ of the inclined surface 21b is more than 90 degrees and less than 175 degrees with respect to the cylindrical surface 21a. This inclination angle θ is the angle formed by the inclined surface 21b and the cylindrical surface 21a.

On the cylindrical surface 20a of the shoulder portion 20 of the inner ring 7, a pulsar ring 24 is attached and fitted. The pulsar ring 24 comprises a detection surface configured by alternatingly providing N and S magnetic pole pieces in the circumferential direction. On the inner peripheral surface of the one axial direction side of the outer ring 2, a pulsar ring protection cover 25 is attached and fitted. The cover 25 comprises an annular portion 26 provided along the detection surface of the pulsar ring 24 and a cylindrical portion 27 that projects from the radially inward portion of the annular portion 26 toward the one axial direction. Interference between the inner ring 7 and the connecting portion 26a connecting the annular portion 27 and the cylindrical portion 26 of the cover 25 is avoided with a step portion 21 formed on the inner ring 7.

Figure 3:
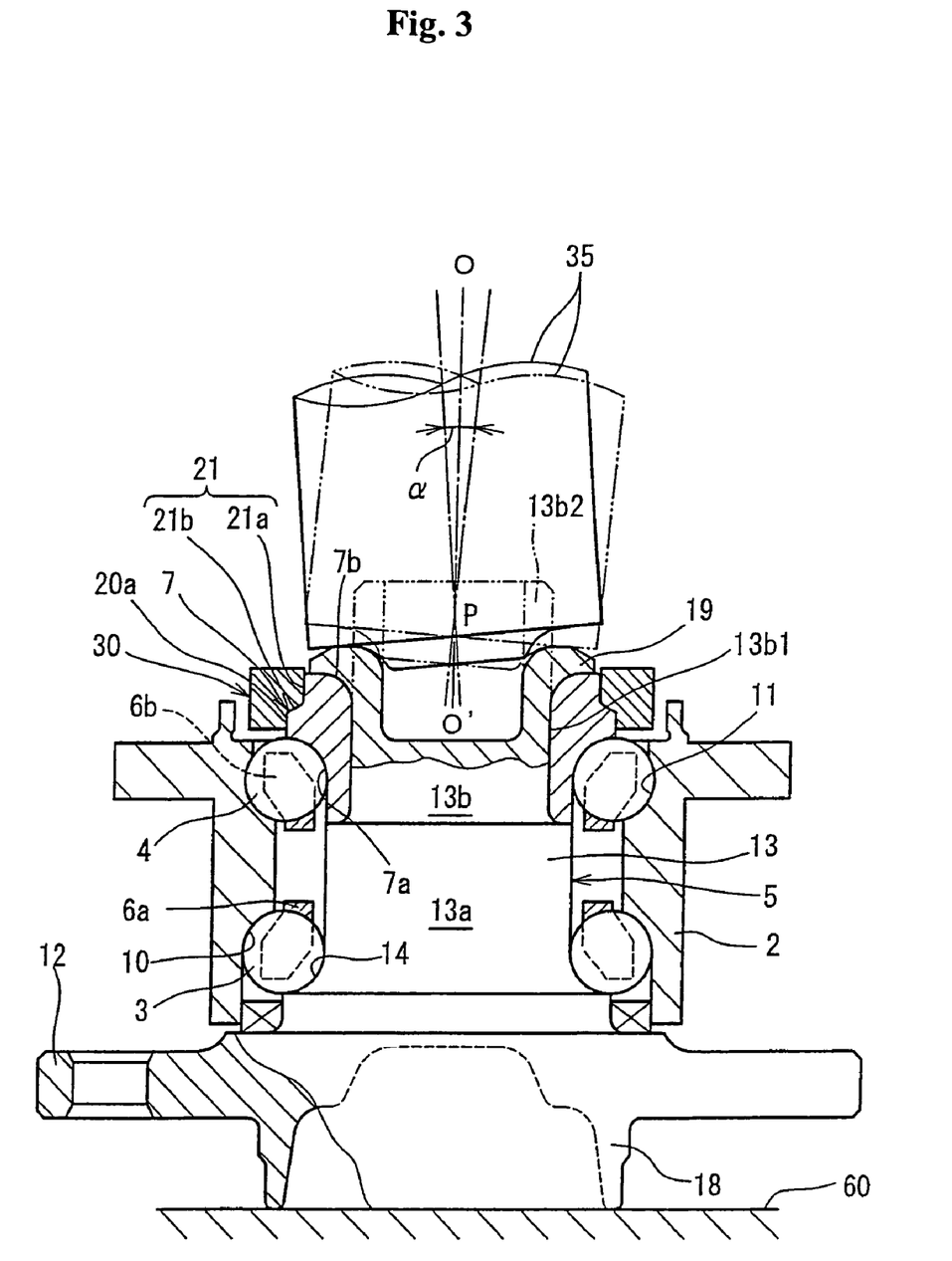
FIG. 3 is a cross-sectional view illustrating a rolling bearing unit in a partially manufactured state.

Manufacture of the rolling bearing unit 1 will be explained with reference to FIGS. 3 and 4. As illustrated in FIG. 3, the inner shaft 5 is placed on a support table 60 with the spigot portion 18 downward, an assembly comprising a ball row 3 incorporated in a retainer 6a is assembled in the raceway portion 10 of the outer ring 2, an inner shaft body 13 of the inner shaft 5 is inserted in the outer ring 2 and the ball row 3 is engaged with the raceway portion 14 of the large-diameter shaft 13a of the inner shaft 5.

The assembly comprising a ball row 4 incorporated in the retainer 6 is then assembled in the raceway portion 11 of the outer ring 2, and the inner ring 7 is attached and fitted on the inner ring fitting part 13b1 of the small-diameter shaft 13b of the inner shaft body 13 so that the ball row 4 is engaged with the raceway portion 7a of the inner ring 7.

An annular binding jig 30 having the form of a short cylinder with a cross-sectional shape that follows the outer peripheral surface shape of the inner ring 7 is fitted on an intermediate point of the inner ring 7.

Figure 4:
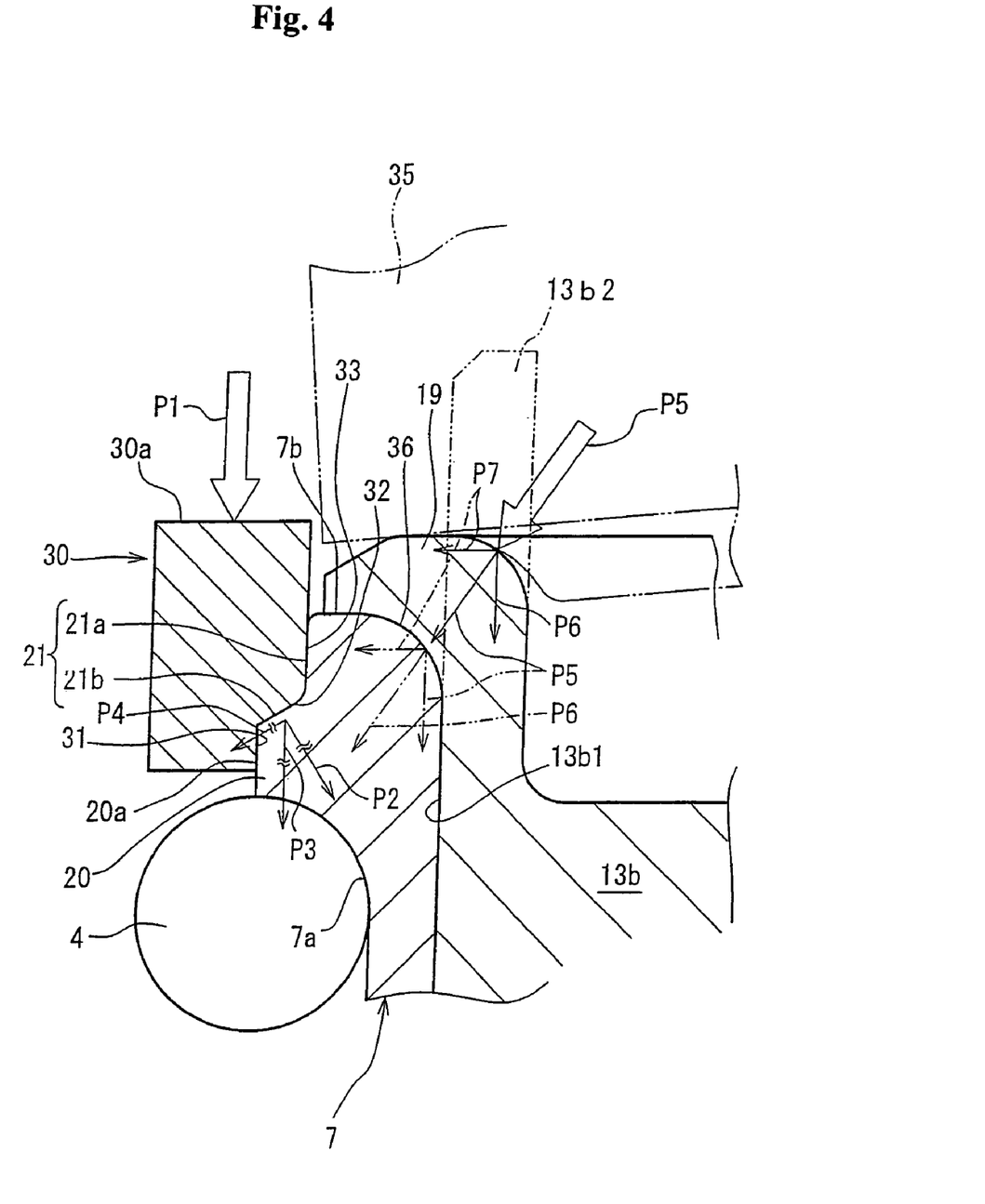
FIG. 4 is an enlarged cross-sectional view of the portion of FIG. 3.

An inner peripheral surface of the annular binding jig 30, as illustrated in FIG. 4, is formed of a large-diameter binding surface 31 that fits onto and interlocks with each of the cylindrical surface 20a of the shoulder portion 20 of the inner ring 7, an inclined binding surface 32 that mates with the inclined surface 21b of the step portion 21 and a small-diameter binding surface 33 that mates with the cylindrical surface 21a of the step portion 21.

In a state where the annular binding jig 30 has been fitted on the inner ring 7, the one axial direction side face 30a of the annular binding jig 30 is pressed with a force P1 towards the other axial direction side. Preload is thereby applied to the inside of the bearing. In a state where this preload has been applied, roll crimping is performed using a crimping jig 35 that rolls at a rolling angle α at a point P on the axis line around a rolling axis line O-O', causing the shaft end 13b2 of the small-diameter shaft 13b to expand radially outward. Roll crimping causes the shaft end 13b2 of the small-diameter shaft 13b to deform, bending radially outward, so that it is pressed against the outer face 7b on the one axial direction side of the inner ring 7.

When force P1 is applied on the annular binding jig 30, a force P3 pushing the inclined surface 21b in the axial direction operates on the inclined surface 21b of the step portion 21 of the inner ring 7. The components of this force P3 are a force P2 that vertically presses the inclined surface 21b and a force P4 that operates along the inclined surface 21b. The component P2 operates as a force opposing the forces (forces P5 and P7) that press and widen the inner ring 7.

The crimping force P5 from the crimping jig 35 that operates on the shaft end 13b2 of the small-diameter shaft 13b and is directed toward an inner peripheral bending surface 36 of the one axial end of the inner ring 7, operates on the bending surface 36 of the inner ring 7 via the shaft end 13b2. The components of this force P5 are a force P6 directed toward one axial direction side and a force P7 directed radially outward. These forces P5 and P7 operate as forces pressing and widening the inner ring 7 from such directions.

With the forces having the relationship as described above, between the inner ring 7 and the shaft end 13b2 of the small-diameter shaft 13b, forces P2 and P7 operate in directions that are mutually offsetting. At this time, the force P1 pressing the annular binding jig 30 at the one axial direction side and the inclination angle θ of the inclined surface 21b are set so as to make the force P2 considerably larger than the force P5 and its component P7. With such settings, the force operating to press and widen the inner ring 7 is reduced or offset, preventing the inner ring 7 from becoming axially inclined or, in some cases, damaged, due to crimping by the crimping jig 35.

Thereafter, further crimping of the crimping jig 35 is performed, and the shaft end 13b2 (illustrated with a dotted line in FIG. 4) of the small-diameter shaft 13b is pressed against the end face 7b of the inner ring 7 to form a crimped section 19 (illustrated with a solid line in FIG. 4, it is the same element as the shaft end 13b2 illustrated with the dotted line). After the crimped section 19 is formed, the annular binding jig 30 is removed from the inner ring 7. Thus, because preload is applied to the bearing interior by the annular binding jig 30, when the shaft end 13b2 of the small-diameter shaft 13b has been crimped on the end face 7b, the end face 7b of the inner ring 7 and the crimped section 19 press tightly against each other, applying the desired preload to the bearing interior.

Further, because the force P2 offsets the force P7, this means that virtually only an axial force operates on the inner ring 7, so that the necessary preload is effectively applied to the bearing interior.

Figure 5:
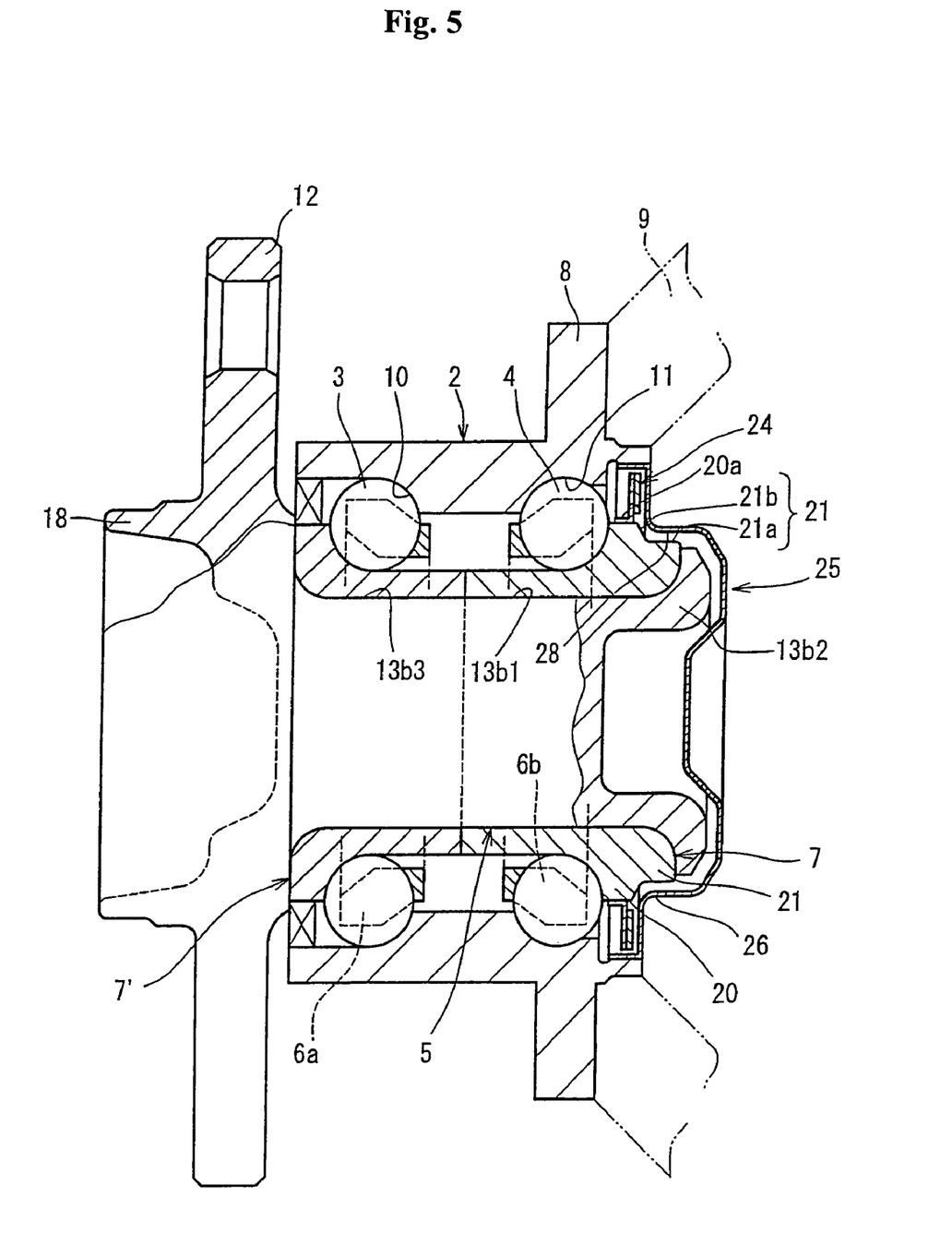
FIG. 5 is a cross-sectional view of a rolling bearing unit according to another embodiment of the present invention.

Another preferred embodiment will be explained with reference to FIGS. 5 and 6. On the outer peripheral surface of the inner shaft body 13 of the inner shaft 5, two inner rings 7, 7' are disposed in parallel in the axial direction. The outer peripheral surface of the inner shaft body 13 comprises an inner ring fitting part 13b1 of the inner ring 7 on the one axial end and an inner ring fitting part 13b3 of the inner ring 7' on the other axial end. On the one axial direction side of the shoulder portion 20 of the inner ring 7 on the one axial end, an annular step portion 21 is formed. The constitution of this step portion 21 is same as that of the step portion 21 of the preferred embodiment illustrated in FIG. 1 through FIG. 4.

Figure 6:
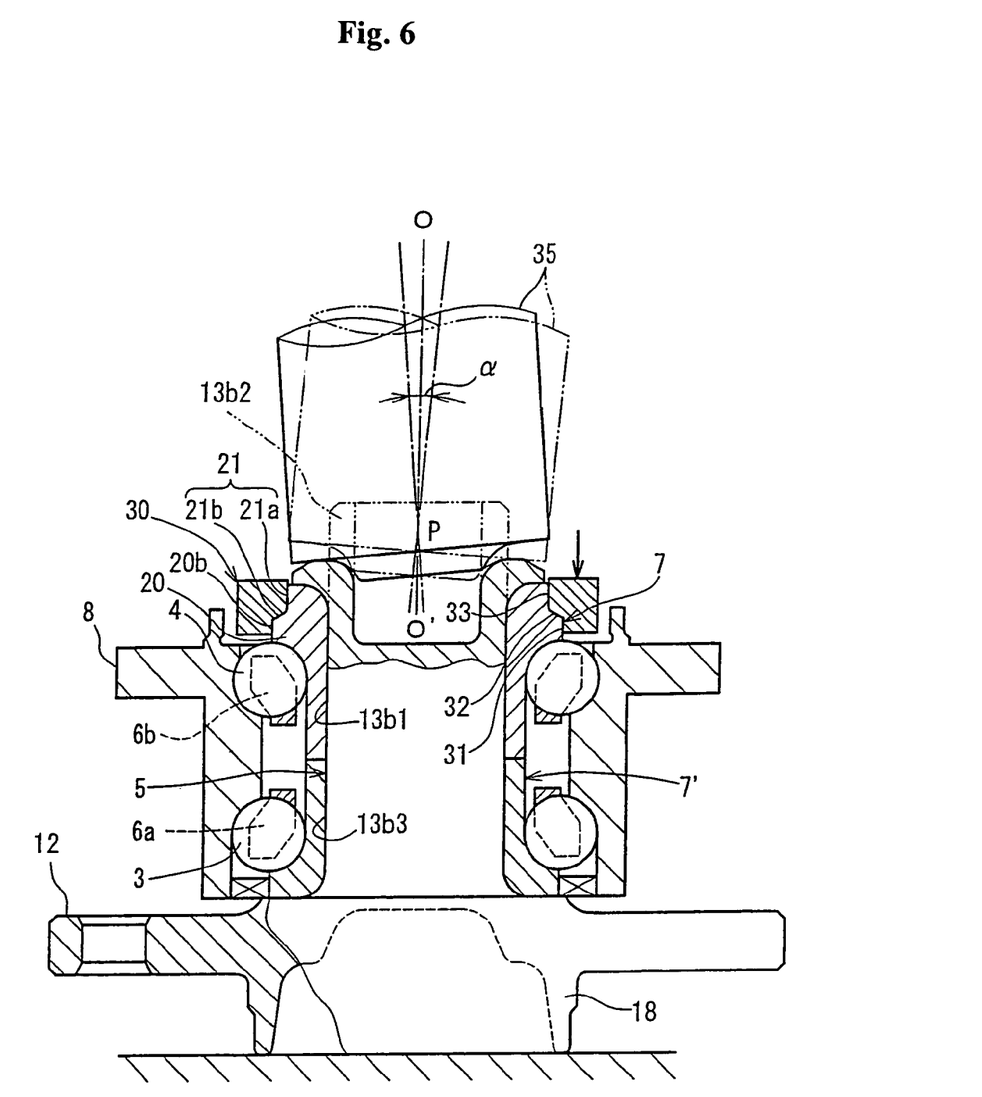
FIG. 6 is a cross-sectional view illustrating the unit of FIG. 5 in a partially manufactured state.

In this rolling bearing unit 1 as well, as illustrated in FIG. 6, with the use of an annular binding jig 30, between the inner ring 7 and the cylindrical shaft end 13b2 of the small-diameter shaft 13b, forces operating in mutually opposing directions offset each other. Thus when the shaft end 13b2 is crimped, the force operating to press and widen the inner ring 7 on the one axial direction side is reduced or offset, effectively preventing axial inclination of or damage to the inner ring 7.

Figure 7:
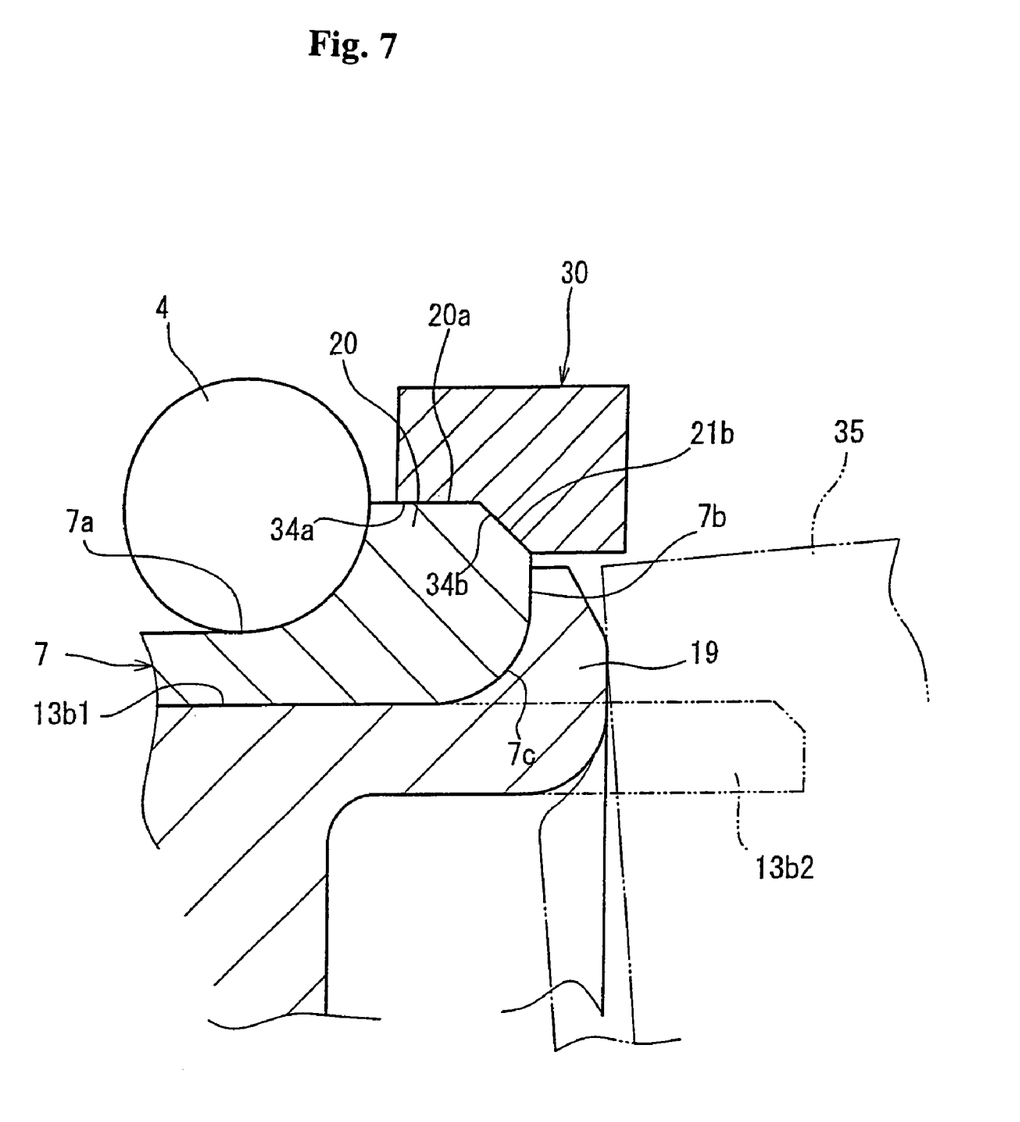
FIG. 7 is an enlarged cross-sectional view of a portion of yet another embodiment.

Another preferred embodiment of the present invention will be explained with reference to FIG. 7. In this rolling bearing unit 1, an inclined surface 21b is formed on the one axial direction side of the shoulder portion 20 of the inner ring 7. The annular binding jig 30 of this preferred embodiment comprises a small-diameter binding surface 34a mating with the outer peripheral surface 20a of the shoulder portion 20 of the inner ring 7 and an inclined binding surface 34b mating with the inclined surface 21b.

In this preferred embodiment as well, between the inner ring 7 and the shaft end 13b2 of the small-diameter shaft 13b, forces operating in mutually opposing directions offset each other. Thus when the shaft end 13b2 is crimped, the force operating to press and widen the inner ring 7 is reduced or offset, effectively preventing axial inclination of or damage to the inner ring 7.

The present invention can be used in a rolling bearing unit for supporting wheels of a vehicle and the like.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

What is claimed is:

1. A rolling bearing unit comprising:
an outer ring;
an inner shaft disposed radially inward of said outer ring, said inner shaft including an outer peripheral surface and a first axial end surface,
said inner shaft including an inner ring fitting part disposed on said outer peripheral surface adjacent to said first axial end surface; and
an inner ring connecting to said inner ring fitting part, said inner ring including first and second axial end surfaces,
said first end surface of said inner shaft end being crimped onto said first axial end surface of said inner ring,
wherein:
said inner ring includes a shoulder, said shoulder including an outer peripheral surface, said outer peripheral surface including an outer diameter;
said inner ring includes an annular step portion disposed axially between said shoulder and first axial end surface of said inner ring;
said step portion includes a cylindrical surface, said cylindrical surface including an axial outer diameter, said outer diameter of said cylindrical surface being smaller than said outer diameter of the shoulder portion; and
said step portion includes an inclined surface, said inclined surface connecting said cylindrical surface to said shoulder, said inclined surface including a diameter, and said diameter of said inclined surface expanding towards said second axial end surface of said inner ring and towards said shoulder,
whereupon said first axial end surface of said inner shaft being crimped onto said first axial end surface of said inner ring and an annular binding jig configured to resist movement of said inner ring during said crimping being matingly engageable against the entirety of said inclined surface, said inclined surface opposes along the entirety thereof a force of said binding jig that is disposed on said inclined surface and which vertically presses against said inclined surface whereby said binding jig force and a force of said crimping extending radially outward relative to said inner ring and said inner shaft each act in opposite directions so as to offset one other so that said inner ring is substantially prevented from moving relative to said binding jig, each portion of the cylindrical surface and the shoulder providing respective seating surfaces on which the binding jig is seatable so as to resist movement of the inner ring;
and further comprising:
a pulsar ring attached and fitted on the inner ring shoulder portion's outer peripheral surface; and
a cover attached and fitted to an end portion of the outer ring, wherein the cover comprises an annular portion, a cylindrical portion and a connecting portion connecting the annular portion and the cylindrical portion, the annular portion provided adjacent to a detection surface of the pulsar ring and extending between a radially outward direction and a radially inward direction, the cylindrical portion formed along an axial direction, the connecting portion disposed in proximity to the inner ring step portion's inclined surface, and wherein the cylindrical portion has an inner diameter smaller than the diameter of the inner ring shoulder portion's outer peripheral surface and the cylindrical portion has an outer diameter larger than the diameter of the inner ring step portion's cylindrical surface.

2. The rolling bearing unit of claim 1, wherein an inclination angle is defined by an angle between said inclined surface and said cylindrical surface, and said inclination angle being from 90 degrees to 175 degrees.

3. A rolling bearing unit comprising:
an outer ring;
an inner shaft disposed radially inward of said outer ring, said inner shaft including an outer peripheral surface and a first axial end surface; and
two axial inner rings adjacently disposed on said outer peripheral surface of said inner shaft, each of the rings including first and second axial end surfaces,
wherein:
said first axial end surface of said inner shaft is crimped onto said first axial end surface of one of said two axial inner rings;
said one inner ring onto which said inner shaft is crimped includes a shoulder portion, said shoulder portion including an outer peripheral surface, said outer peripheral surface including an outer diameter;

said one inner ring onto which said inner shaft is crimped includes a circular annular step portion disposed axially between said shoulder portion and said first axial end surface of said inner ring;

said step portion includes a cylindrical surface, said cylindrical surface including an axial outer diameter, said outer diameter of said cylindrical surface being small than said outer diameter of said shoulder portion; and said step portion includes an annular inclined surface connecting said cylindrical surface to said outer peripheral surface of said shoulder portion, said inclined surface including a diameter, and said diameter of said inclined surface expanding towards said second axial end surface of said inner ring and towards said shoulder portion, whereupon said first axial end surface of said inner shaft being crimped onto said first axial end surface of said inner ring onto which said inner shaft is crimped and an annular binding jig configured to resist movement of said inner ring onto which said inner shaft is crimped during said crimping being matingly engageable against the entirety of said inclined surface, said inclined surface opposes along the entirety thereof a force of said binding jig that is disposed on said inclined surface and which vertically presses against said inclined surface whereby said binding jig force and a force of said crimping extending radially outward relative to said inner ring onto which said inner shaft is crimped and said inner shaft each act in opposite directions so as to offset one other so that said inner ring onto which said inner shaft is crimped is substantially prevented from moving relative to said binding jig, each portion of the cylindrical surface and the shoulder portion providing respective seating surfaces on which the binding jig is seatable so as to resist movement of the inner ring onto which said inner shaft is crimped;

and further comprising:

a pulsar ring attached and fitted on said one inner ring shoulder portion's outer peripheral surface; and a cover attached and fitted to an end portion of the outer ring, wherein the cover comprises an annular portion, a cylindrical portion and a connecting portion connecting the annular portion and the cylindrical portion, the annular portion provided adjacent to a detection surface of the pulsar ring and extending between a radially outward direction and a radially inward direction, the cylindrical portion formed along an axial direction, the connecting portion disposed in proximity to said one inner ring step portion's inclined surface, and wherein the cylindrical portion has an inner diameter smaller than the diameter of said one inner ring shoulder portion's outer peripheral surface and the cylindrical portion has an outer diameter larger than the diameter of said one inner ring step portion's cylindrical surface.

4. A rolling bearing unit comprising:

an outer ring;

an inner shaft disposed radially inward of the outer ring and having an inner ring fitting part on an outer peripheral surface of one axial direction side of the inner shaft;

an inner ring fitted on the inner ring fitted part, wherein an end of the inner shaft at said one axial side is crimped securing the inner ring, wherein the inner ring has a shoulder portion and an annular step portion at said one axial direction side of the inner shaft, the shoulder portion having a cylindrical surface formed along the axial direction, the step portion having a cylindrical surface formed along the axial direction and being at a smaller outer diameter of the inner ring than the cylindrical surface of the shoulder portion, the inner ring having an inclined surface that connects the cylindrical surface of the shoulder and the cylindrical surface of the step portion, a diameter of the inclined surface gradually decreasing toward said one axial direction side of the inner shaft;

a pulsar ring attached and fitted on the inner ring shoulder portion's cylindrical surface;

a cover attached and fitted to an end portion of the outer ring at said one axial direction side of the inner shaft, wherein the cover comprises an annular portion, a cylindrical portion and a connecting portion connecting the annular portion and the cylindrical portion, the annular portion provided adjacent to a detection surface of the pulsar ring and extending between a radially outward direction and a radially inward direction, the cylindrical portion formed along the axial direction, the connecting portion disposed in proximity to the inclined surface of the inner ring, and wherein the cylindrical portion has an inner diameter smaller than the diameter of the inner ring shoulder portion's cylindrical surface and the cylindrical portion has an outer diameter larger than the diameter of the inner ring step portion's cylindrical surface.

5. The rolling bearing unit of claim 4, wherein inclination angle of said inclined surface is more than 90 degrees and less than 175 degrees relative to the shoulder's cylindrical surface.

\* \* \* \* \*